UNITED STATES PATENT OFFICE.

CHESTER COMSTOCK, OF BROOKLYN, NEW YORK.

LUBRICATING COMPOUND.

No. 804,455.　　　　Specification of Letters Patent.　　　　Patented Nov. 14, 1905.

Application filed February 28, 1905. Serial No. 247,659.

*To all whom it may concern:*

Be it known that I, CHESTER COMSTOCK, a citizen of the United States, residing in Brooklyn, in the county of Kings and State of New York, have invented certain new and useful Improvements in Lubricating Compounds, of which the following is a specification.

The invention has reference to a compound which serves as an efficient and economical lubricant adapted for use in all classes of work and which can be vended in granular or powdered form, so that the same may be used in combination with a fluid.

It is a design of the invention to provide a compound in which a non-liquid lubricant—such, for instance, as graphite—may form the essential part and which may be carried to the parts to be lubricated by means of water or another equivalent agent.

The compound comprises two components, a non-soluble and preferably non-liquid lubricant, into which is imported a suitable intermediary or vehicle, such as soft soap, and these two are compound in such a manner as to form a powder.

In one of its specific forms the compound comprehends the admixture of soft soap in about one part to about eight parts of the lubricant, the soft soap operating as an intermediary or vehicle for the fluid which is imparted through the lubricant.

This compound will in practice be used by causing water to flow along a surface of a mass of this compound when contained in some suitable cup or receptacle, either by causing the water to be dropped onto the mass or be associated therewith in any other suitable manner.

One of the important features of this invention is that the compound may be put up in a powdered state and that particles or granules of such powder may be carried to the parts to be lubricated in predetermined and in suitable quantities, whereby efficient results in lubrication may be obtained.

Having thus described the invention, I claim—

1. A powdered lubricating compound comprising graphite mixed with soft soap, said graphite being several times in excess of the soap, whereby to leave the lubricant in a powdered state.

2. A lubricating compound comprising graphite in eight parts and soft soap in one part, said compound being in powdered form.

Signed at Nos. 9 to 15 Murray street, in the city, county, and State of New York, this 25th day of February, 1905.

CHESTER COMSTOCK.

Witnesses:
　FRED. W. BARNACLO,
　JOHN O. SEIFERT.